US008744718B2

(12) United States Patent
Johansson et al.

(10) Patent No.: US 8,744,718 B2
(45) Date of Patent: Jun. 3, 2014

(54) METHOD AND MODULE FOR CONTROLLING A VEHICLE'S SPEED

(75) Inventors: Oskar Johansson, Stockholm (SE); Maria Södergren, Segeltorp (SE); Fredrik Roos, Segeltorp (SE)

(73) Assignee: Scania CV AB (SE)

(*) Notice: Subject to any disclaimer, the term of this patent is extended or adjusted under 35 U.S.C. 154(b) by 0 days.

(21) Appl. No.: 13/806,797

(22) PCT Filed: Jun. 21, 2011

(86) PCT No.: PCT/SE2011/050809
§ 371 (c)(1),
(2), (4) Date: Feb. 26, 2013

(87) PCT Pub. No.: WO2011/162706
PCT Pub. Date: Dec. 29, 2011

(65) Prior Publication Data
US 2013/0151106 A1    Jun. 13, 2013

(30) Foreign Application Priority Data
Jun. 23, 2010    (SE) ..................... 1050667

(51) Int. Cl.
*B60K 31/00* (2006.01)
*G08G 1/123* (2006.01)
*B60K 31/04* (2006.01)
*B60K 31/12* (2006.01)

(52) U.S. Cl.
CPC ............. *B60K 31/00* (2013.01); *B60K 31/0058* (2013.01); *B60K 31/042* (2013.01); *B60K 31/12* (2013.01); *G08G 1/123* (2013.01)
USPC ................... 701/93; 701/94; 701/95; 701/96; 701/97; 701/98; 340/988

(58) Field of Classification Search
USPC .............. 701/3, 11, 23, 33.4, 48, 54–68, 70, 701/78–80, 93–96, 123, 410; 180/170, 180/65.265–65.285; 318/587; 340/988
See application file for complete search history.

(56) References Cited

U.S. PATENT DOCUMENTS 4,870,583 A * 9/1989 Takahashi et al. .............. 701/93
5,758,306 A * 5/1998 Nakamura ..................... 701/93
(Continued)

FOREIGN PATENT DOCUMENTS

DE  10 2009 030 784 A1   2/2010
WO     WO 01/15927 A1    3/2001
WO   WO 2006/107267 A1  10/2006

OTHER PUBLICATIONS

International Search Report mailed Oct. 6, 2011 in corresponding PCT International Application No. PCT/SE2011/050809.

(Continued)

*Primary Examiner* — Thomas Tarcza
*Assistant Examiner* — Tyler J Lee
(74) *Attorney, Agent, or Firm* — Ostrolenk Faber LLP

(57) ABSTRACT

A method for controlling a vehicle's speed includes adopting a desired speed $v_{set}$ for the vehicle; determining by means of map data and location data a horizon for the intended itinerary which is made up of route segments with at least one characteristic for each segment; effecting the following during each of a number of simulation cycles (s) each comprising a number N of simulation steps conducted at a predetermined frequency f: making a first prediction of the vehicle's speed $v_{pred\_cc}$ along the horizon with conventional cruise control when $v_{set}$ is presented as reference speed, which prediction depends on the characteristics of said segment; comparing the predicted vehicle speed $v_{pred\_cc}$ with $v_{min}$ and $v_{max}$, which demarcate a range within which the vehicle's speed is intended to be; making a second prediction of the vehicle's speed $v_{pred\_Tnew}$ along the horizon when the vehicle's engine torque T is a value which depends on the result of said comparison in the latest preceding simulation cycle (s−1); determining at least one reference value for how the vehicle's speed is to be influenced on the basis of at least one of said comparisons in that simulation cycle (s) and the predicted vehicle speed $v_{pred\_Tnew}$; sending to a control system in the vehicle said at least one reference value with respect to which the vehicle is thereupon regulated. The invention comprises also a module for controlling a vehicle's speed.

26 Claims, 5 Drawing Sheets

(56) References Cited

U.S. PATENT DOCUMENTS

| | | | | |
|---|---|---|---|---|
| 5,774,820 | A | * | 6/1998 | Linden et al. .................... 701/93 |
| 6,990,401 | B2 | * | 1/2006 | Neiss et al. ..................... 701/96 |
| 7,085,637 | B2 | * | 8/2006 | Breed et al. ..................... 701/38 |
| 8,392,087 | B2 | * | 3/2013 | Kodama et al. ................. 701/75 |
| 8,452,509 | B2 | * | 5/2013 | Sujan et al. ..................... 701/70 |
| 2003/0221886 | A1 | * | 12/2003 | Petrie, Jr. ...................... 180/170 |
| 2004/0068359 | A1 | | 4/2004 | Neiss et al. ..................... 701/96 |
| 2009/0063000 | A1 | * | 3/2009 | Kodama et al. ................. 701/75 |
| 2010/0049400 | A1 | | 2/2010 | Duraiswamy et al. .......... 701/35 |
| 2012/0197501 | A1 | * | 8/2012 | Sujan et al. ..................... 701/51 |

OTHER PUBLICATIONS

Erik Hellström et al., "Look-ahead control for heavy trucks to minimize trip time and fuel consumption," Control Engineering Practice, 2009, vol. 17, No. 2, pp. 245-254, ISSN 0967-0661.

Erik Hellström "Explicit use of road topography for model predictive cruise control in heavy trucks," Master's thesis performed in Vehicular Systems, Department of Electrical Engineering, Linköpings universitet, Reg. No. LiTH-ISY-EX—05/3660—SE, Feb. 21, 2005.

Anders Fröberg, "Efficient Simulation and Optimal Control for Vehicle Propulsion", Department of Electrical Engineering, Linköpings universitet, SE-581 83 Linköping, Sweden, 2008.

* cited by examiner

METHOD AND MODULE FOR CONTROLLING A VEHICLE'S SPEED

CROSS-REFERENCE TO RELATED APPLICATIONS

The present application is a 35 U.S.C. §§371 national phase conversion of PCT/SE2011/050809, filed Jun. 21, 2011, which claims priority of Swedish Application No. 1050667-3, filed Jun. 23, 2010, the contents of which are incorporated by reference herein. The PCT International Application was published in the English language.

FIELD OF THE INVENTION

The present invention relates to a method and a module for controlling a vehicle's speed on the basis of its predicted speed according to the introduction to the independent claims.

BACKGROUND TO THE INVENTION

Today's traditional cruise controls maintain a constant reference speed which is usually set by the driver. The value of the reference speed is only altered when the driver him/herself adjusts it while driving. The reference speed is then passed to a control system which controls the vehicle in such a way that, if possible, the vehicle maintains the reference speed. If the vehicle is equipped with an automatic gear change system, its gears change so that it can maintain desired speed.

When cruise control is used in hilly terrain, the cruise control system will try to maintain set speed both uphill and downhill. This sometimes results in the vehicle accelerating over the crest of a hill and potentially into a subsequent downgrade on which it has then to be braked to avoid exceeding the set speed, which is a fuel-expensive way of running the vehicle. Even in cases where it does not accelerate over the crest, the vehicle may of course need to be braked downhill to avoid exceeding the set speed.

To reduce fuel use on undulating roads in particular, economical cruise controls such as Scania's Ecocruise® have been developed. The cruise control tries to estimate the vehicle's current speed and also has knowledge of the historical running resistance. The economical cruise control may also be provided with map data with topographical information. The vehicle is then located on the map, e.g. by means of GPS, and the running resistance along the route ahead is estimated. The vehicle's reference speed may thus be optimised for different types of road in order to save fuel.

An example of a cruise control which uses topographical information is described in the document entitled "Explicit use of road topography for model predictive cruise control in heavy trucks" by Erik Hellström, ISRN: LiTH-ISY-EX—05/3660—SE. The cruise control here is by real-time optimisation, and a cost function is used to define the optimisation criteria. A large number of different solutions are calculated and evaluated, and the solution resulting in least cost is employed. The considerable number of calculations involved makes it necessary to use for the purpose a processor with a suitably large capacity.

In other forms of cruise control the number of possible solutions is reduced by choosing instead to iterate from one solution along the vehicle's intended itinerary. However, the topography of the carriageway, the weight of the vehicle and the performance of the engine may result in differences in demand for processor capacity for determining the reference speed. More calculations are required in the case, for example, of a heavily laden truck with medium-high engine power travelling on an undulating road than in that of a lightly laden truck with a high engine power travelling on a relatively level road. This is because the truck in the first case is likely to accelerate on each downgrade and slow down on each upgrade, whereas in the second case the truck will run quite evenly.

The processor incorporated in the system will therefore be subject to relatively large demands, since the load upon the processor may vary greatly from situation to situation. For example, its capacity needs to be large enough to cope quickly with situations where a large number of calculations have to be done. It therefore needs to be dimensioned to cope with such situations despite the fact that they occur during only a limited proportion of the processor time used.

The dissertation entitled "Efficient Simulation and Optimal Control for Vehicle Propulsion" by Anders Fröberg, Linköping 2008, describes how various control strategies are simulated in order to arrive at speed profile, fuel consumption and run time along a section of intended itinerary. This is followed by evaluating which is the most advantageous control strategy, on the basis of a cost function with a parameter $\lambda$ which indicates how important run time is. The parameter does however depend on the weight of the vehicle if it is desired to achieve the same relationship between reduction in fuel consumption and gain in run time. Moreover, comfort requirements are not catered for.

The object of the present invention is to propose an improved system for controlling a vehicle's speed so that the amount of fuel used can be minimised and, in particular, in such a way that the load upon the processor becomes lighter and more even. A further object of the invention is to be able to set the cruise control so that it is possible to choose to prioritise smaller amount of fuel or shorter run time.

SUMMARY OF THE INVENTION

At least one of the above objects is achieved by a method for controlling a vehicle's speed which comprises:
  adopting a desired speed $v_{set}$ for the vehicle;
  determining by means of map data and location data a horizon for the intended itinerary which is made up of route segments with at least one characteristic for each segment;
  effecting the following during each of a number of simulation cycles (s) each comprising a number N of simulation steps conducted at a predetermined frequency f:
    making a first prediction of the vehicle's speed $v_{pred\_cc}$ along the horizon with conventional cruise control when $v_{set}$ is presented as reference speed, which prediction depends on the characteristics of said segment;
    comparing the predicted vehicle speed $v_{pred\_cc}$ with $v_{min}$ and $v_{max}$, which demarcate a range within which the vehicle's speed is intended to be;
    making a second prediction of the vehicle's speed $v_{pred\_Tnew}$ along the horizon when the vehicle's engine torque T is a value which depends on the result of said comparison in the latest preceding simulation cycle (s−1);
    determining at least one reference value which indicates how the vehicle's speed is to be influenced on the basis of at least one of said comparisons in that simulation cycle (s) and the predicted vehicle $v_{pred\_Tnew}$;

sending to a control system in the vehicle said at least one reference value with respect to which the vehicle is thereupon regulated.

The object or objects are achieved according to another aspect by a module for controlling a vehicle's speed which comprises an input unit adapted to receiving a desired speed $v_{set}$ for the vehicle, a horizon unit adapted to determining by means of map data and location data a horizon for the intended itinerary which is made up of route segments with at least one characteristic for each segment, and a calculation unit adapted to effecting the following during each of a number of simulation cycles (s) each comprising a number N of simulation steps conducted at a predetermined frequency f:

- making a first prediction of the vehicle's speed $v_{pred\_cc}$ along the horizon with conventional cruise control when $v_{set}$ is presented as reference speed, which prediction depends on the characteristics of said segment;
- comparing the predicted vehicle speed $v_{pred\_cc}$ with $v_{min}$ and $v_{max}$, which demarcate a range within which the vehicle's speed is intended to be;
- making a second prediction of the vehicle's speed $v_{pred\_Tnew}$ along the horizon when the vehicle's engine torque T is a value which depends on the result of said comparison in the latest preceding simulation cycle (s−1);
- determining at least one reference value which indicates how the vehicle's speed is to be influenced on the basis of at least one of said comparisons in that simulation cycle (s) and the predicted vehicle $v_{pred\_Tnew}$. The module is further adapted to sending to a control system in the vehicle said at least one reference value with respect to which the vehicle is thereupon regulated.

The method described results in a substantially constant load upon the processor, since the same number of predictions is made during each simulation cycle at a constant frequency. The processor load is independent of the power output of the vehicle's engine, the weight of the vehicle and the topography of the route. The processor concerned thus knows how much processor capacity will be needed, which is therefore consistently allocated. The processor load will thus be the same in different situations of changing topology and be independent of the vehicle's engine torque. It is thus also possible for the processor concerned to be dimensioned without having to cater for any extreme worst scenarios but rather to cater for uniform processor load. The processor cost can thus be reduced. According to an embodiment, speed variations along the horizon ahead are predicted for only two different modes of driving the vehicle, resulting in a relatively light processor load.

In a preferred embodiment, the choice of reference value is based on a cost function which weights reduction in energy consumption and gain in run time with traditional cruise control. The weighting parameter then depends very little on vehicle weight, journey length and engine type, thereby simplifying the calculations.

Unlike traditional cruise control, it is for example possible for engine efficiency and comfort/drivability to be catered for when choosing which control strategies to evaluate.

Preferred embodiments are described in the dependent claims and the detailed description.

BRIEF DESCRIPTION OF THE ATTACHED DRAWINGS

The invention is described below with reference to the attached drawings, in which.

DETAILED DESCRIPTION OF PREFERRED EMBODIMENTS OF THE INVENTION

Figure 1:
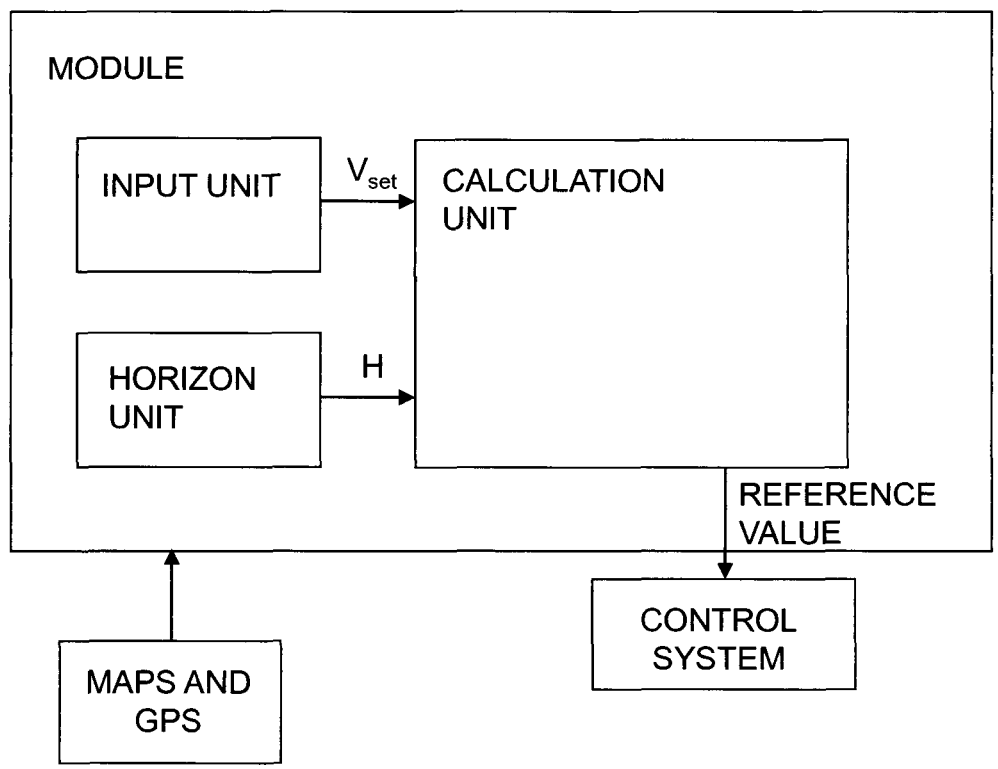
FIG. 1 depicts a module according to an embodiment of the invention.

FIG. 1 depicts a module for controlling a vehicle's speed according to an embodiment of the invention. The module comprises an input unit adapted to receiving a desired speed $v_{set}$ for the vehicle. The driver may for example set a desired speed $v_{set}$ which he/she wishes the vehicle to maintain. The module comprises also a horizon unit adapted to determining a horizon for the intended itinerary by means of map data and location data. The horizon is made up of route segments with at least one characteristic for each segment. An example of a segment's characteristics might be its gradient α in radians.

In the description of the present invention, GPS (Global Positioning System) is indicated for determining location data for the vehicle, but it should be appreciated that other kinds of global or regional positioning systems are also conceivable to provide the vehicle with location data, e.g. systems which use a radio receiver to determine the vehicle's location. The vehicle may also use sensors to scan the surroundings and thereby determine its location.

FIG. 1 illustrates how the module assimilates information about the intended itinerary via maps (map data) and GPS (location data). The itinerary is conveyed bit by bit to the module, e.g. via CAN. The module may be separate from or form part of the control system or systems which are to use reference values for regulating. An example of a control system is the vehicle's engine control system. Alternatively, the map and positioning system unit may also be part of a system which is to use reference values for regulating. In the module, the bits are put together in a horizon unit to form a horizon and are processed by the processor unit to create an internal horizon with respect to which the control system can regulate. The horizon is then continually supplemented by new bits from the GPS and map data unit to maintain a desired length of horizon. The horizon is thus updated continuously when the vehicle is in motion.

CAN (controller area network) is a serial bus system specially developed for use in vehicles. The CAN data bus makes digital data exchange possible between sensors, regulating components, actuators, control devices, etc. and ensures that two or more control devices can have access to the signals from a given sensor in order to use them to control components connected to them.

The module comprises also a calculation unit adapted, during each of a number of simulation cycles (s) each comprising a number N of simulation steps conducted at a predetermined frequency f, to making a first prediction of the vehicle's speed $v_{pred\_cc}$ along the horizon with conventional cruise control when $v_{set}$ is presented as reference speed, which prediction depends on said segment's characteristics. The calculated vehicle speed $v_{pred\_cc}$ is compared with $v_{min}$ and $v_{max}$, which demarcate a range within which the vehicle's speed is intended to be, and a second prediction of the vehicle's speed $v_{pred\_Tnew}$ is made along the horizon when the vehicle's engine torque T is a value which depends on the result of said comparison in the latest preceding simulation cycle (s−1). At least one reference value is determined which indicates how the vehicle's speed is to be influenced on the basis of at least one of said comparisons in that simulation cycle (s) and the predicted vehicle speed $v_{pred\_Tnew}$. The module is further adapted to sending to a control system in the vehicle said at least one reference value with respect to which the vehicle is thereupon regulated. How the predictions are made is explained in more detail below.

The module and/or the calculation unit comprise at least a processor and memory adapted to performing all of the calculations, predictions etc. herein described.

Figure 2:
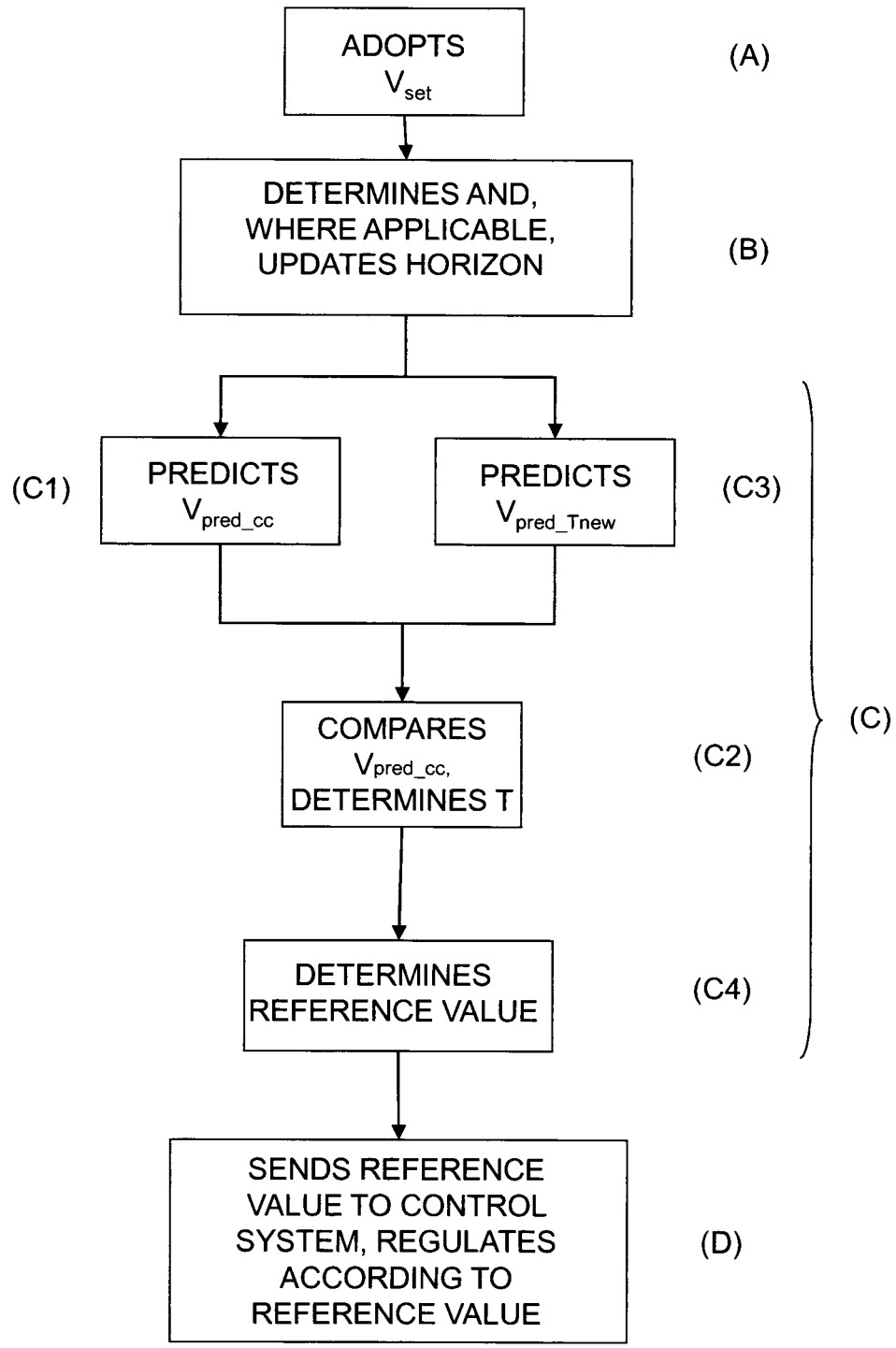
FIG. 2 is a flowchart for the method according to an embodiment of the invention.

FIG. 2 is a flowchart of the steps involved in the method for controlling the vehicle's speed according to an embodiment of the invention. The method comprises as a first step A) adopting $v_{set}$ as a desired speed for the vehicle to maintain, and as a second step B) determining by means of map data and location data a horizon for the intended itinerary made up of route segments with at least one characteristic for each segment. According to the method, a number of simulation cycles (s) are then conducted during the length of the horizon. A simulation cycle (s) comprises C) a number N of simulation steps conducted at a predetermined frequency f and entails C1) making a first prediction of the vehicle's speed $v_{pred\_cc}$ along the horizon with conventional cruise control when $v_{set}$ is presented as reference speed, which depiction depends on said segment's characteristics, C2) comparing the predicted vehicle speed $v_{pred\_cc}$ with $v_{min}$ and $v_{max}$, which demarcate a range within which the vehicle's speed is intended to be, C3) making a second prediction of the vehicle's speed $v_{pred\_Tnew}$ along the horizon when the vehicle's engine torque T is a value which depends on the result of said comparison in the latest preceding simulation cycle (s−1), and C4) determining at least one reference value which indicates how the vehicle's speed is to be influenced on the basis of at least some of said comparisons in that simulation cycle (s) and the predicted vehicle speed $v_{pred\_Tnew}$. As a further step D) said at least one reference value with respect to which the vehicle is to be regulated is sent to a control system in the vehicle. This method achieves a constant and predetermined processor load when the vehicle's reference speed is determined and regulated.

During a simulation cycle (s) the prediction according to C1) and the prediction according to C3) are made in parallel, as illustrated in FIG. 2. The result of the comparison of $v_{pred\_cc}$ with $v_{min}$ and $v_{max}$ in the latest preceding simulation cycle (s−1) determines the torque T at which $v_{pred\_Tnew}$ is to be predicted in simulation cycle (s). If for example each simulation cycle comprises 100 simulation steps at a frequency of 100 Hz, each simulation cycle takes 1 second.

$v_{set}$ is therefore the driver's input signal of desired cruise control speed, and the reference value is the value with respect to which the vehicle is regulated. The reference value is preferably any from among a reference vehicle speed $v_{ref}$, a reference torque $T_{ref}$ or a reference engine speed $\omega_{ref}$. $v_{ref}$ is presented to the engine control unit's speed regulator. For traditional cruise controls, $v_{ref}=v_{set}$. The speed regulator then controls the vehicle's speed according to $v_{ref}$ by demanding necessary torque from the engine's torque regulator. When the reference value is instead a reference torque $T_{ref}$, $T_{ref}$ may be sent directly to the engine's torque regulator, and when the reference value is a reference engine speed $\omega_{ref}$, $\omega_{ref}$ may be sent directly to the engine's speed regulator. If $v_{pred\_cc}$ when compared with $v_{min}$ and $v_{max}$ does not go beyond these limits, $v_{set}$ is presented, according to an embodiment, as reference value. The reference value then depends entirely on this comparison. Which reference value will be aimed at for other cases is explained below.

How the various predicted speeds are arrived at will now be explained.

The total force $F_{env}$ acting upon the vehicle from the environment is made up of rolling resistance $F_{roll}$, gravitation F and air resistance $F_{air}$. Gravitation is calculated as $$F = m \cdot g \cdot \alpha \qquad (1)$$

where m is the weight of the vehicle and $\alpha$ the gradient of the road in radians. Since mostly only small angles are concerned, $\sin(\alpha)$ is approximated to $\alpha$. Air resistance is calculated as a factor k multiplied by the square of vehicle speed, as follows:

$$F_{env} = F_{roll,present} + m \cdot 9.82 \cdot \alpha + k \cdot v_{i-1}^2 \qquad (2)$$

$$F_{roll,present} = F_{roll,est}, m = m_{est}, k = \frac{1}{2} \rho \cdot C_d \cdot A \qquad (3)$$

where A is the vehicle's estimated frontal area, $C_d$ the resistance coefficient which depends on the streamline shape of the object, $\rho$ the density of the air and m the weight of the vehicle estimated by its weight estimation system as $m_{est}$. Current rolling resistance $F_{roll,present}$ is also estimated in the vehicle continuously as $F_{roll,est}$. For calculation of $m_{est}$ and $F_{roll,est}$ please refer to the dissertation entitled "Fuel Optimal Powertrain Control for Heavy Trucks Utilizing Look Ahead" by Maria Ivarsson, Linköping 2009, ISBN 978-91-7393-637-8. $v_{i-1}$ is the vehicle's predicted speed at preceding simulation step.

The force $F_{drive}$ which propels the vehicle forwards depends on which prediction is made. It is taken according to an embodiment as either maximum possible power (maximum torque) or least possible power (minimum torque, e.g. drag torque). It is possible, however, to take any desired force within the range $$F_{min} \leq F_{drive} \leq F_{max} \qquad (4)$$

and the vehicle's speed $v_{pred\_Tnew}$ (and $v_{pred\_Tk+new}$ as explained below) may therefore be predicted at torques other than maximum or minimum torque. $F_{max}$ is calculated as maximum available engine torque, a function of engine speed, multiplied by the total transmission ratio and divided by the effective tyre radius $r_{wheel}$. $F_{min}$ is arrived at in the same way as $F_{max}$ but with minimum torque instead:

$$F_{max} = \frac{T_{max}(\omega) \cdot i_{tot}}{r_{wheel}} \qquad (5)$$

$$F_{min} = \frac{T_{min}(\omega) \cdot i_{tot}}{r_{wheel}} \qquad (6)$$

where n is the vehicle's engine speed and $i_{tot}$ the vehicle's total transmission ratio.

The vehicle's acceleration Acc is given by:

$$Acc = (F_{drive} - F_{env})/m \qquad (7)$$

According to an embodiment, simulation steps during a simulation cycle of N steps have a constant step length which depends on the vehicle's speed. The length dP of each simulation step is given by:

$$dP = K \cdot v_{init} \quad (8)$$

where K is a time constant, e.g. 0.9 s, and $v_{init}$ is prevailing vehicle speed at the beginning of the simulation.

The time dt for a simulation step is given by:

$$dt = dP/v_{i-1} \quad (9)$$

where $v_{i-1}$ is predicted speed at preceding simulation step i-1.

The speed difference dv is:

$$dv = Acc \cdot dt \quad (10)$$

Energy consumed dW for a simulation step is given by:

$$dW = dP \cdot (F_{drive} - F_{min}) \quad (11)$$

The speed $v_i$ at current simulation step becomes:

$$v_i = v_{i-1} + dv \quad (12)$$

Total time $t_i$ for current simulation step is:

$$t_i = t_{i-1} + dt \quad (13)$$

Total energy consumed W for current simulation step is:

$$W_i = W_{i-1} + dW \quad (14)$$

Figure 3:
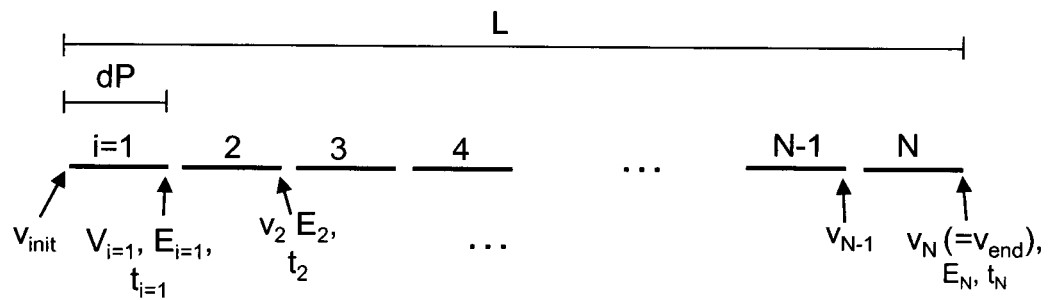
FIG. 3 illustrates a predicted speed during a simulation cycle according to an embodiment of the invention.

FIG. 3 illustrates how a vehicle speed is predicted during a simulation cycle of N simulation steps with a horizon which is L meters long. The prediction is discontinued after N simulation steps, i.e. after a simulation cycle. A fresh simulation cycle then begins in the next time sample. Each simulation cycle has a predetermined frequency f. At a frequency of 100 Hz, for example, 100 simulation steps are conducted per second. As the length of each simulation step depends on the vehicle's speed $v_{init}$ at the beginning of the prediction, the length of the predicted section of the horizon varies with the vehicle's speed. For example, at 80 km/h (22.22 m/s) the horizon becomes 2 km long if f=100 Hz and K=0.9 s, since each simulation step dP then becomes 20 m long and over 100 steps the horizon then becomes 2 km. FIG. 3 shows a fresh speed v, predicted at each simulation step i. Since the same number of predictions ($v_{pred\_cc}$ and $v_{pred\_Tnew}$ and also, in an alternative embodiment, $v_{pred\_Tk+new}$) is made at each simulation step, the processor load depends entirely on the number of simulation steps within the horizon. The number of simulation steps is determined by the frequency f, which is a predetermined value. The maximum processor load can therefore always be determined in advance, which is advantageous in that the processor can accordingly be dimensioned in advance. The processor load is therefore independent of road topography, vehicle weight and engine type. $v_{pred\_cc}$ and $v_{pred\_Tnew}$ may be vectors with N values, or alternatively only maximum and minimum values for $v_{pred\_cc}$ and $v_{pred\_Tnew}$ are saved in each simulation cycle, as explained in more detail below. The latest predicted speed within the horizon is designated $v_N$, and also $v_{end}$. The time $t_i$ and the energy consumption $E_i$ up to simulation step i may also be arrived at by formulae (13) and (14).

Figure 4:
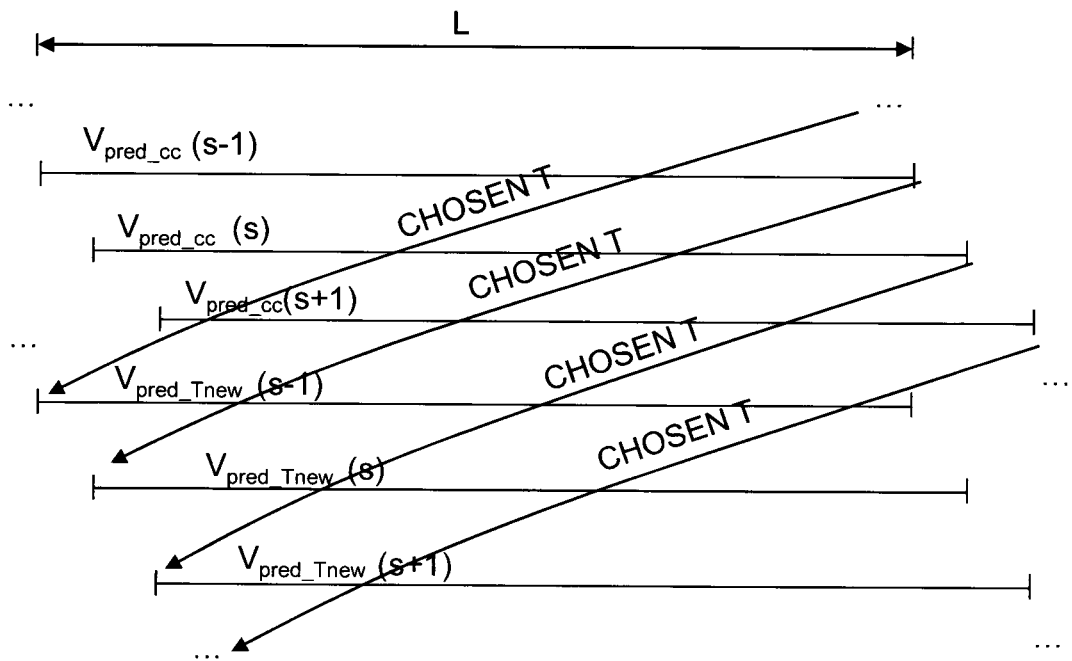
FIG. 4 illustrates a number of simulation cycles according to an embodiment of the invention.

FIG. 4 illustrates three simulation cycles (s-1), (s) and (s+1) and the predictions made during each cycle. In each cycle, a prediction of $v_{pred\_cc}$ and a prediction of $v_{pred\_Tnew}$ are made. $v_{pred\_cc}$ is compared with $v_{min}$ and $v_{max}$ after each cycle, and the result of this comparison serves as a basis for determining preferably the torque T for $v_{pred\_Tnew}$ for the next cycle, as explained previously and as illustrated in FIG. 4 by arrows marked "CHOSEN T". This is also illustrated at step C2 in the flowchart in FIG. 2. Two different vehicle speeds are thus predicted during each simulation cycle. According to a preferred embodiment, a third driving mode $v_{pred\_Tk+new}$ is also predicted in each simulation cycle, and the driving mode with respect to which the vehicle is to be controlled is then decided by cost calculations, as explained in more detail below. A control unit is then presented with reference values representing the driving mode with respect to which the vehicle is to be controlled, which may therefore be either a reference vehicle speed, a reference torque or a reference engine speed.

Reference values which the vehicle's control system is to aim at are thus determined continuously when the vehicle is in motion. They are preferably determined as from certain predetermined distance ahead of the vehicle and are then synchronised in the control unit so that the calculated reference value for a given situation is set at the right time. An example of such a distance is 50 meters, which the control unit therefore caters for in regulating the vehicle.

Figure 5:
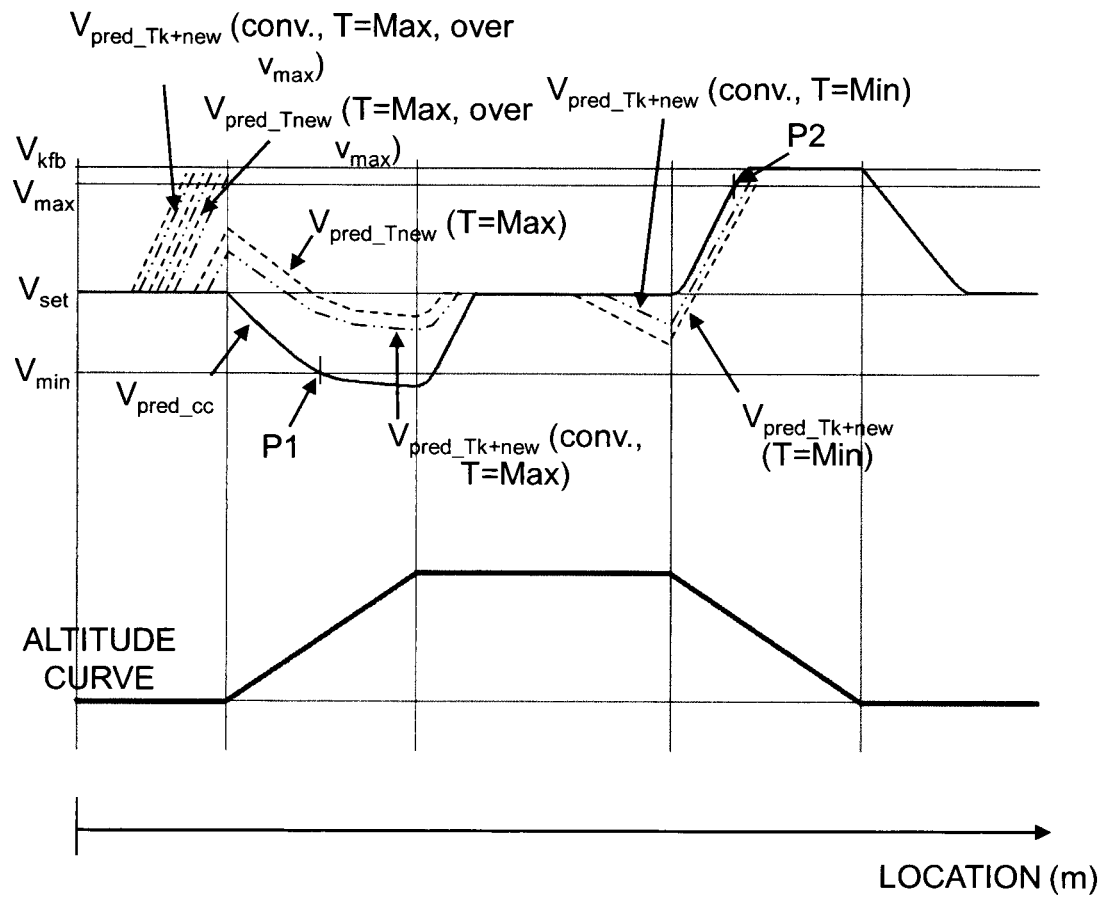
FIG. 5 illustrates the vehicle's predicted speeds according to an embodiment of the invention.

An embodiment according to the invention will now be explained with reference to FIG. 5. The upper part of FIG. 5 illustrates the predicted speed $v_{pred\_cc}$ with conventional cruise control along a horizon with a road profile which is depicted in the lower part of the diagram. $v_{pred\_cc}$ is compared continually with $v_{min}$ and $v_{max}$, and if it is below $v_{min}$, an upgrade is identified. If $v_{pred\_cc}$ is above $v_{max}$, a downgrade is identified. If an upgrade is identified and $v_{pred\_cc}$ is therefore lower than $v_{min}$, as at P1 in FIG. 5, the vehicle's engine torque T in the second prediction $v_{pred\_Tnew}$ is taken as a maximum torque in the next simulation cycle. This prediction is represented by a broken line in FIG. 5. This presupposes, however, that $v_{pred\_cc}$ was below $v_{min}$ before potentially going above $v_{max}$. FIG. 5 illustrates by three broken lines in the upper diagram how $v_{pred\_Tnew}$ is predicted at a maximum torque and is then predicted to exceed $v_{max}$. Since this scenario is undesirable, $v_{set}$ is presented as reference speed. Only when $v_{pred\_Tnew}$ is predicted to not go above $v_{max}$ may this speed be presented as reference value.

If a downgrade is identified and $v_{pred\_cc}$ is therefore higher than $v_{max}$, as at P2 in FIG. 5, the vehicle's engine torque T in the second prediction $v_{pred\_Tnew}$ is presented as a minimum torque in the next simulation cycle, which is represented by a broken line in FIG. 5. This presupposes, however, that $v_{pred\_cc}$ was higher than $v_{max}$ before potentially going below $v_{min}$. According to an embodiment, the calculation unit described with reference to FIG. 1 is adapted to performing the calculations etc. described.

If $v_{pred\_cc}$ is higher than or equal to $v_{min}$ and lower than or equal to $v_{max}$, the reference value is taken as $v_{set}$. This means for example that no hill is identified and hence that $v_{pred\_cc}$ is outside the speed range or that the vehicle will be travelling on a level road. $v_{set}$ therefore then becomes the reference speed with respect to which the vehicle's control system is to regulate. $v_{pred\_Tnew}$ is preferably still predicted at maximum or minimum torque in order to achieve uniform processor load.

According to an embodiment, the method comprises also making in each simulation cycle a third prediction of the vehicle's speed $v_{pred\_Tk+new}$ along the horizon when the simulation is done first with conventional cruise control and thereafter when the vehicle's torque T is replaced by a maximum torque, a minimum torque or some other torque, see formula (4), resulting in an alternative driving mode, depending on said comparison. This is represented in FIG. 5 by a chain-dotted line. The same criteria for deciding when and at what torque $v_{pred\_Tnew}$ is to be predicted are used to decide when and at what torque $v_{pred\_Tk+new}$ is to be predicted. Another embodiment uses other criteria for determining a different torque which results in an alternative driving mode, e.g. when particular comfort requirements are applicable.

$v_{pred\_Tk+new}$ comprises preferably first conducting one or more simulation steps with conventional cruise control and then conducting the remaining simulation steps at some other torque, e.g. maximum torque or minimum torque. For example, simulation steps 1 to 4 in FIG. 3 are conducted with conventional cruise control, followed by simulation steps 5 to N at maximum or minimum torque. The three chain-dotted lines in the upper part of FIG. 5 illustrate how $v_{pred\_Tk+new}$ is predicted to exceed $v_{max}$. Since this scenario is undesirable, $v_{set}$ is presented as reference speed. Only when neither $v_{pred\_Tk+new}$ nor $v_{pred\_Tnew}$ is predicted to go above $v_{max}$ may this driving mode be catered for in comparison with a cost function according to an embodiment, see formulae (15) and (16) below.

If the prediction of $v_{pred\_Tnew}$ exceeds limit values set directly or indirectly by the driver, e.g. $v_{min}$ and $v_{max}$, then $v_{set}$ is presented instead as reference value.

Three predictions with different control strategies are thus made according to this embodiment along a limited section of road with the length L ahead of the vehicle, also called the horizon. Each prediction then preferably involves calculating the vehicle's speed, total energy consumption $E_N$ and run time $t_N$. Another embodiment calculates also minimum and maximum speeds for the predictions, as described in more detail below. The total energy consumption $E_N$ for a predicted speed during a simulation cycle is calculated by (14). Similarly, the total time $t_N$ for a predicted speed during the simulation cycle is calculated by (13). The prediction with conventional cruise control $v_{pred\_cc}$ gives the total energy consumption designated $E_{pred\_cc}$ and the total run time designated $t_{pred\_cc}$ and decides which other control strategies/driving modes are to be predicted.

If an upgrade is identified, the total time $t_{LA\_Tnew}$ and the total energy consumption $E_{LA\_Tnew}$ for the predicted speed $v_{pred\_Tnew}$ at maximum torque are arrived at. $v_{pred\_Tk+new}$ is also predicted as explained above when an upgrade is identified, whereupon the total time $t_{LA\_Tk+new}$ and the total energy consumption $E_{LA\_Tk+new}$ for $v_{pred\_Tk+new}$ during a simulation cycle are arrived at. The maximum torque may be replaced by some other high engine torque which results in acceleration, e.g. if the working point has better efficiency and/or results in comfortable acceleration.

If a downgrade is identified, $t_{LA\_Tnew}$ and $E_{LA\_Tnew}$ are arrived at, being in this case respectively the total time and energy consumption for $v_{pred\_Tnew}$ at minimum torque, and $v_{pred\_Tk+new}$ is predicted as explained above, thereby arriving at $t_{LA\_Tk+new}$ and $E_{LA\_Tk+new}$, which in this case are respectively the total time and the energy consumption for $v_{pred\_Tk+new}$ during a simulation cycle at minimum torque. The minimum torque is for example drag torque, although this may be replaced by some other low engine torque which results in retardation, e.g. if the working point has better efficiency and/or results in comfortable acceleration.

To choose which out of $v_{pred\_Tnew}$ and $v_{pred\_Tk+new}$ is the better control strategy on each occasion, the method comprises according to an embodiment evaluating the predictions by calculating the cost for the predicted driving mode by means of at least one cost function $J_{Tnew}$, $J_{Tk+new}$. The calculation unit is preferably adapted to performing these calculations. According to an embodiment, the costs $J_{Tnew}$ and $J_{Tk+new}$ for the driving mode according to the second and third predictions are determined by applying a weighting parameter β to their energy reduction and run time reduction compared with the driving mode according to the first prediction, as illustrated in the cost functions:

$$J_{Tnew} = \frac{E_{LA,Tnew}}{E_{pred\_cc}} + \beta \frac{t_{LA,Tk+new}}{t_{pred\_cc}} \quad (15)$$

$$J_{Tk+new} = \frac{E_{LA,Tnew}}{E_{pred\_cc}} + \beta \frac{t_{LA,Tk+new}}{t_{pred\_cc}} \quad (16)$$

The cost functions are thus standardised with respect to the vehicle's predicted driving mode with conventional cruise control ($E_{pred\_cc}$ and $t_{pred\_cc}$). The cost estimates are thus independent of, for example, the vehicle's weight. The cost functions are based solely on energy consumption and run time, the fuel consumption is not calculated. This means that there is no need for any model of the engine's efficiency, thereby simplifying the calculations for evaluating which is the most advantageous control strategy. The weighting parameter β depends very little on vehicle weight, distance run and engine type. The introduction of modes or potential settings is thus simplified. According to an embodiment, the driver or the system may choose whether, for example, to prioritise less fuel expenditure or shorter run time by altering the weighting parameter. This function may be presented to the driver via an interface in, for example, the vehicle's instrument panel.

Preferably, the costs $J_{Tnew}$ and $J_{Tk+new}$ are compared, and this comparison is used as a basis for determining the reference speed $v_{ref}$ with respect to which the vehicle is to be regulated. The prediction of the speed ($v_{pred\_Tnew}$, $v_{pred\_Tk+new}$) which results in least cost is preferably presented as reference value.

For the vehicle to reach minimum or maximum torque, the reference speed $v_{ref}$ may be presented with an offset. Minimum torque may for example be presented by presenting the reference speed $v_{ref}$ as a low value below $v_{min}$, e.g. $v_{min}-k_1$, where $k_1$ is within the range 1-10 km/h. The engine's control unit will then present drag torque for the engine. Maximum torque may be reached by the reference speed being presented as a high speed above $v_{max}$, e.g. $v_{max}+k_2$, where $k_2$ is within the range 1-10 km/h.

According to an embodiment, the highest speed $v_{pred\_cc,max}$ and the lowest speed $v_{pred\_cc,min}$ during the first prediction of the vehicle's speed $v_{pred\_cc}$ with ordinary cruise control are determined and are then used in the comparison with $v_{max}$ and to determine the vehicle's engine torque T in the second prediction and, according to some embodiments, in the third prediction. The calculation unit is then adapted to performing these calculations. It is therefore only necessary to save scalars instead of whole vectors, thereby saving memory space. Nor need the values be saved after they have been used in the simulation cycle, since no adjustment of reference values takes place rearwards in the horizon and they will not be used again for more calculations. This difference compared with some other calculation algorithms saves processor capacity and helps to achieve constant light processor load. In the same way it is also possible for the highest and lowest speeds for the predictions of $v_{pred\_Tnew}$ and $v_{pred\_Tk+new}$ to be determined during a simulation cycle.

Figure 6:
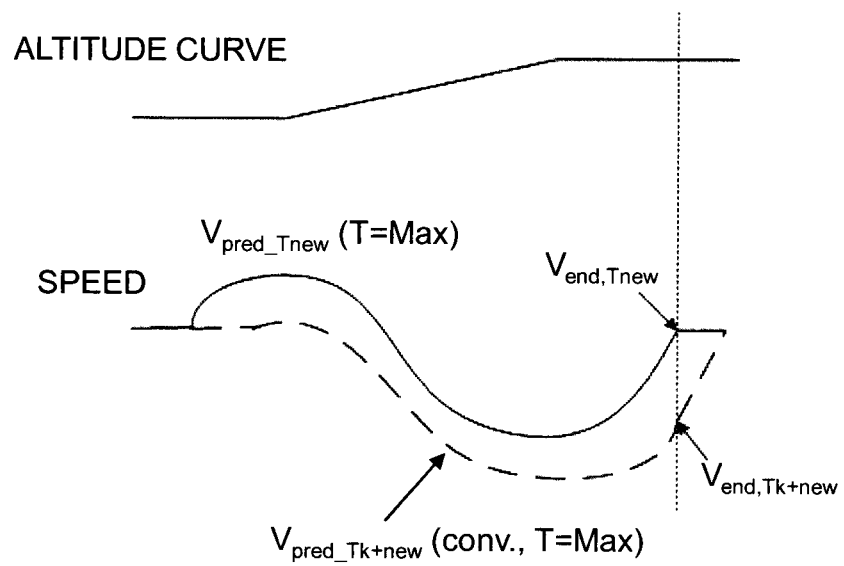
FIG. 6 illustrates various final speeds for different predictions of the vehicle's speed.

The various strategies most commonly do not have the same final speed at the end of the horizon, a fact which is preferably assimilated in the evaluation of the costs of the control strategies. This is illustrated in FIG. 6, in which $v_{pred\_Tnew}$ is predicted at maximum torque and $v_{pred\_Tk+new}$ is predicted as conventional cruise control in some steps and thereafter at maximum torque. $v_{pred\_Tnew}$ results in a higher final speed $v_{end\_Tnew}$, than the final speed for $v_{pred\_Tk+new}$, which is $v_{end\_Tk+new}$, since $v_{pred\_Tk+new}$ initially resembles conventional cruise control, which means that the speed in this case does not increase as much, since the maximum torque is applied later. However, simulation cycle ends after certain number N of steps (represented by a broken line), whereupon the final speeds for the respective predictions are also arrived at. According to an embodiment, the method comprises adding a penalty to at least one cost function on the basis of whether the vehicle in the predictions does not reach the same final speed. A penalty may be calculated on the basis of the energy consumption and run time, respectively designated $E_\gamma$ and $t_\gamma$, which are required if after the horizon the final speed $v_{end,Tk+new}$ of the third prediction is to be brought to the final speed $v_{end\_Tnew}$ for the second prediction, while at the same time having the two predictions run equal distances. The cost functions will then be of the nature of:

$$J_{Tnew} = \frac{E_{LA,Tnew} + E_{\gamma,Tnew}}{E_{pred\_cc}} + \beta \frac{t_{LA,Tnew} + t_{\gamma,Tnew}}{t_{pred\_cc}} \quad (17)$$

$$J_{Tk+new} = \frac{E_{LA,Tk+new} + E_{\gamma,Tk+new}}{E_{pred\_cc}} + \beta \frac{t_{LA,Tk+new} + t_{\gamma,Tk+new}}{t_{pred\_cc}} \quad (18)$$

Arriving at the energy consumption and run time ($E_\gamma$ and $t_\gamma$) entails doing a number of calculations. The calculations are based on Newton's second law with the assumption of constant running resistance ($F_{env}$ is constant, i.e. it is here assumed that the road is level and that the air resistance and rolling resistance do not depend on vehicle speed):

$$m\dot{v} = (F_{drive} - F_{env}) \quad (19)$$

On these assumptions, vehicle speed remains a linear function of time.

For the third prediction to be moved from $v_{end,Tk+new}$ to $v_{end,Tnew}$, the run time becomes:

$$t_{\gamma,Tk+new} = (v_{end,Tnew} - v_{end,Tk+new}) \frac{m}{F_{drive} - F_{env}} \quad (20)$$

The distance covered by the vehicle is:

$$s_\gamma = \frac{F_{drive} - F_{env}}{2m} t_{\gamma,Tnew}^2 + v_{end,Tk+new} \cdot t_{\gamma,Tk+new} \quad (21)$$

The energy requirement is:

$$E_{\gamma,Tk+new} = F_{driv} \cdot s_\gamma \quad (22)$$

For the second prediction to travel the same distance ($s_\gamma$) with no change of vehicle speed ($v_{end,Tnew}$), the run time is:

$$t_{\gamma,Tnew} = \frac{s_\gamma}{v_{end,Tk+new}} \quad (23)$$

The energy requirement is:

$$E_{\gamma,Tnew} = F_{env} \cdot s_\gamma \quad (24)$$

If $v_{end,Tk+new} < v_{end,Tnew}$ a maximum torque ($F_{drive} = F_{max}$) is applied, and if $v_{end,Tk+new} > v_{end,Tnew}$ a drag torque ($F_{drive} = 0$) is applied.

The standardisation values $E_{pred\_cc}$ and $t_{pred\_cc}$ are, according to an embodiment, not updated to obtain values for exactly the same distance run as the other predictions. For example, the values are updated for each simulation cycle. The distance $s_\gamma$ is so short relative to the total distance predicted that the standardisation works well even without catering for energy and time consumption for conventional cruise control during $s_\gamma$.

The speed presented as reference speed is preferably that which results in the lowest total cost ($J_{Tnew}$ or $J_{Tk+new}$) According to an embodiment, whereas previously the choice was to use an alternative control according to $v_{pred\_Tnew}$ or $v_{pred\_Tk+new}$ (i.e. not $v_{set}$), the alternative control may be achieved during the time when the vehicle is for example on a steep hill. Control hopping between different driving modes is thus avoided. A steep hill may be identified as a gradient exceeding a certain value.

An embodiment takes into account the engine's efficiency and comfort/drivability when choosing which control strategies to predict (i.e. those which result in $v_{pred\_Tnew}$ and $v_{pred\_Tk+new}$). Taking as magnitude and/or time the torque which results in $v_{pred\_Tnew}$ and $v_{pred\_Tk+new}$ differently depending on the engine's efficiency or on the basis of comfort requirements makes it possible to achieve comfortable and economical cruise control. This may be implemented on the basis of rules whereby for example there is a certain torque at a certain engine speed, or whereby torque which results in more acceleration than a certain limit value is never allowed.

The present invention is not restricted to the embodiments described above. Sundry alternatives, modifications and equivalents may be used. The above embodiments therefore do not limit the scope of the invention, which is defined by the attached claims.

The invention claimed is:

1. A method for controlling a vehicle's speed, performed by a control unit on a vehicle, the method comprises:
    adopting a desired speed $v_{set}$ for the vehicle;
    determining by means of map data and location data a horizon for an intended itinerary which is made up of route segments with at least one characteristic for each segment;
    effecting the following during each of a number of simulation cycles (s) each comprising a number N of simulation steps conducted at a predetermined frequency f:
    making a first prediction of the vehicle's speed $v_{pred\_cc}$ along the horizon with conventional cruise control when $v_{set}$ is presented as reference speed, which prediction depends on the characteristics of said segment;
    comparing the first predicted vehicle speed $v_{pred\_cc}$ with $v_{min}$ and $v_{max}$, which demarcate an intended range for the vehicle's speed;
    making a second prediction of the vehicle's speed $v_{pred\_Tnew}$ along the horizon when the vehicle's engine torque T is a value which depends on the result of the comparison in a latest preceding simulation cycle (s−1);
    making in each simulation cycle a third prediction of the vehicle's speed $v_{pred\_Tk+new}$ along the horizon with ordinary cruise control and thereafter when the vehicle's engine torque T is replaced by a maximum torque or a minimum torque depending on said comparison;
    determining at least one reference value which indicates how the vehicle's speed is to be influenced on the basis of at least one of the comparisons in that simulation cycle (s) and the predicted vehicle speed $v_{pred\_Tnew}$; and
    sending to a control system in the vehicle the at least one reference value with respect to which the vehicle is thereupon regulated.

2. A method according to claim 1, further comprising performing a series of N of the simulation steps to define a cycle of the simulation steps, and the simulation steps during a simulation cycle of N said simulation steps have a constant step length which depends on the vehicle's speed.

3. A method according to claim 1, wherein the reference value is selected from among a reference vehicle speed $v_{ref}$, a reference torque $T_{ref}$ or a reference engine speed $\omega_{ref}$.

4. A method according to claim 1, further comprising performing a series of N of the simulation steps to define a cycle of the simulation steps, and wherein if $v_{pred\_cc}$ is higher than $v_{max}$, the vehicle's engine torque T in the second prediction is taken as a minimum torque in subsequent simulation cycles.

5. A method according to claim 1, further comprising performing a series of N of the simulation steps to define a cycle of the simulation steps, and wherein if $v_{pred\_cc}$ is lower than $v_{min}$ the vehicle's engine torque T in the second prediction, taking that torque is taken as a maximum torque in subsequent simulation cycles.

6. A method according to claim 5, further comprising detecting the highest speed $v_{pred\_cc,max}$ and the lowest speed $v_{pred\_cc,min}$ during the second prediction of the vehicle's speed $v_{pred\_cc}$ with ordinary cruise control and are then using $v_{pred\_cc,max}$ in the comparison with $v_{max}$ and $v_{min}$ to determine the vehicle's engine torque T in the second prediction.

7. A method according to claim 1, further comprising adding a hysteresis to $v_{ref}$.

8. A method according to claim 1, further comprising calculating during each prediction the vehicle's speed profile (v), energy consumption (E) and run time (t).

9. A method according to claim 8, further comprising evaluating the simulations by calculating the cost for the predicted driving modes by means of at least one cost function $J_{Tnew}$, $J_{Tk+new}$.

10. A method according to claim 9, further comprising predicting costs $J_{Tnew}$ and $J_{Tk+new}$ for driving modes according to the second and third predictions by applying a weighting parameter β to their energy reduction and run time reduction compared with the driving mode according to the first prediction.

11. A method according to claim 10, which comprises comparing the costs $J_{Tnew}$ and $J_{Tk+new}$ and determining on the basis of the comparison a reference value with respect to which the vehicle is to be regulated.

12. A method according to claim 9, further comprising adding a penalty to at least one cost function on the basis of the vehicle in the predictions not reaching the same final speed.

13. A module for controlling a vehicle's speed, performed by a control unit on a vehicle comprises:
- an input unit configured for receiving a desired speed $v_{set}$ for the vehicle;
- a horizon unit configured for determining by means of map data and location data a horizon for an intended itinerary which is comprised of route segments with at least one characteristic for each segment;
- a calculation unit configured for effecting the following during each of a number of simulation cycles (s) wherein each cycle comprises a number N of simulation steps conducted at a predetermined frequency f, the steps each comprising:
    making a first prediction of the vehicle's speed $v_{pred\_cc}$ along a horizon with a conventional cruise control when $v_{set}$ is presented as a reference speed, wherein the prediction depends on the characteristics of the segment;
    comparing the first prediction of vehicle speed $v_{pred\_cc}$ with $v_{min}$ and $v_{max}$, which demarcate a range of the vehicle's intended speed;
    making a second prediction of the vehicle's speed $v_{pred\_Tnew}$ along the horizon when the vehicle has an engine torque T having a value which depends on a result of the comparison in the latest preceding simulation cycle (s−1);
    making in each simulation cycle of N simulation steps a third prediction of the vehicle's speed $v_{pred\_Tk+new}$ along the horizon when the prediction is first made with conventional cruise control and thereafter when the vehicle's engine torque T is replaced by a maximum torque or a minimum torque depending on said comparison;
    determining at least one reference value which indicates how the vehicle's speed is to be influenced on the basis of at least one of the comparisons in that simulation cycle (s) and the predicted vehicle speed $v_{pred\_Tnew}$; and
- the module is further configured for sending to a control system in the vehicle said at least one reference value with respect to which the vehicle is thereupon regulated.

14. A module according to claim 13, wherein the simulation steps during a simulation cycle of N simulation steps have a constant step length which depends on the vehicle's speed, and the calculation unit is configured for adjusting the step length according to the vehicle's speed.

15. A module according to claim 13, wherein the reference value is selected from among a reference vehicle speed $v_{ref}$, a reference torque $T_{ref}$ or a reference engine speed $\omega_{ref}$.

16. A module according to claim 13, wherein the calculation unit is configured for calculating if $v_{pred\_cc}$ is higher than or equal to $v_{max}$, and then is configured for taking the vehicle's engine torque T in the second prediction as a minimum torque in subsequent simulation cycles.

17. A module according to claim 13, wherein the calculation unit is configured for calculating if $v_{pred\_cc}$ is lower than or equal to $v_{min}$ and is configured for then taking the vehicle's engine torque T in the second prediction as a maximum torque in subsequent simulation cycles.

18. A module according to claim 16, wherein the calculation unit is configured for determining the highest speed $v_{pred\_cc,max}$ and the lowest speeds $v_{pred\_cc,min}$ during the first prediction of the vehicle's speed $v_{cc}$ with ordinary cruise control, and to using said $v_{pred\_cc,max}$ and $v_{pred\_cc,min}$ in the comparison with $v_{max}$ and $v_{min}$ to determine the vehicle's engine torque T in the second prediction.

19. A module according to claim 13, wherein the calculation unit is configured for adding a hysteresis to $v_{ref}$.

20. A module according to claim 13, wherein the calculation unit is configured for calculating during each prediction the vehicle's speed profile (v), energy consumption (E) and run time (t).

21. A module according to claim 20, wherein the calculation unit is configured for evaluating the simulations by calculating the cost for the predicted driving modes by means of at least one cost function $J_{Tnew}$, $J_{Tk+new}$.

22. A module according to claim 21, wherein the calculation unit is configured for determining the costs modes $J_{Tnew}$ and $J_{Tk+new}$ for driving modes according to the second and third predictions by applying a weighting parameter β to their energy reduction and run time reduction compared with a driving mode according to the first prediction.

23. A module according to claim 20, wherein the calculation unit is configured for comparing the costs $J_{Tnew}$ and $J_{Tk+new}$ and determining on the basis of the comparison the reference value $v_{ref}$ with respect to which the vehicle is to be regulated.

24. A module according to claim 20, wherein the calculation unit is configured for adding a penalty to at least one cost function on the basis of the vehicle in the predictions not reaching the same final speed.

25. A computer programme product pertaining to controlling a vehicle's speed wherein said programme product comprises non-transitory programme code with non-transitory programme instructions for causing a computer system to perform steps according to claim 1 in a vehicle when the instructions in said code are run on said computer.

26. A computer programme product according to claim 25, wherein said product contains a programme code stored on a non-transitory computer-readable medium which can be read by said computer system for performing method steps when said computer programme is run on electronic control unit or another computer connected to said electronic control unit.

\* \* \* \* \*